United States Patent
Furrer et al.

(10) Patent No.: US 9,542,973 B1
(45) Date of Patent: Jan. 10, 2017

(54) ADAPTIVE DATA-DEPENDENT NOISE-PREDICTIVE MAXIMUM LIKELIHOOD DETECTION FOR CHANNELS WITH NON-LINEAR TRANSITION SHIFTS

(71) Applicant: International Business Machines Corporation, Armonk, NY (US)

(72) Inventors: Simeon Furrer, Altdorf (CH); Robert A. Hutchins, Tucson, AZ (US); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/045,012

(22) Filed: Feb. 16, 2016

(51) Int. Cl.
| | | |
|---|---|---|
| G11B 5/09 | (2006.01) |
| G11B 5/02 | (2006.01) |
| G11B 20/10 | (2006.01) |
| G11B 5/008 | (2006.01) |

(52) U.S. Cl.
CPC ..... *G11B 20/10046* (2013.01); *G11B 5/00813* (2013.01)

(58) Field of Classification Search
CPC . G11B 20/10009; G11B 5/09; G11B 2220/90; G11B 20/1403; G11B 5/02; G11B 5/00; G11B 5/035; G11B 5/012
USPC ...... 360/39, 46, 51, 55, 65, 67, 68; 375/229, 375/341, 350
See application file for complete search history.

(56) References Cited

U.S. PATENT DOCUMENTS

| | | | |
|---|---|---|---|
| 7,031,090 B2 | 4/2006 | Ichihara et al. | |
| 8,077,764 B2* | 12/2011 | Eleftheriou | ....... H04L 25/03299 375/229 |
| 8,670,199 B2 | 3/2014 | Blinick et al. | |
| 2013/0128373 A1 | 5/2013 | Qin et al. | |

OTHER PUBLICATIONS

Kurtas et al., "Detection Methods for Data-dependent Noise in Storage Channels," Coding and Signal Processing for Magnetic Recording Systems, CRC Press, Jul. 26, 2004, Chapter 33, 22 pages, retrieved from http://citeseerx.ist.psu.edu/viewdoc/download?doi=10.1.1.85.622&rep=rep1&type=pdf.
Wu et al., "Mean-Adjusted Pattern-Dependent Noise Prediction for Perpendicular Recording Channels With Nonlinear Transition Shift," IEEE Transactions on Magnetics, vol. 44, No. 11, Nov. 2008, pp. 3761-3764.

* cited by examiner

*Primary Examiner* — Nabil Hindi
(74) *Attorney, Agent, or Firm* — Zilka-Kotab, PC

(57) ABSTRACT

In one embodiment, a data storage system includes a head configured to produce a signal representing data stored on a storage medium, a bank of noise whitening filters configured to apply one or more noise whitening filters to the signal to produce a filtered signal, and a data-dependent noise mean calculator configured to estimate a data-dependent noise mean from the filtered signal. The system also includes a branch metric calculator configured to perform one or more branch metric calculations on the filtered signal to produce one or more branch metrics, the one or more branch metric calculations accounting for the data-dependent noise mean. Moreover, the system includes an adaptive data-dependent noise-predictive maximum likelihood (D3-NPML) detector configured to generate an output stream from the one or more branch metric calculations.

20 Claims, 9 Drawing Sheets

ADAPTIVE DATA-DEPENDENT NOISE-PREDICTIVE MAXIMUM LIKELIHOOD DETECTION FOR CHANNELS WITH NON-LINEAR TRANSITION SHIFTS

BACKGROUND

In the field of magnetic storage systems, an electrical circuit called a read channel transforms physical magnetic flux changes measured in a data read head into abstract bits representing information stored to a magnetic medium. The abstract bits are produced by a symbol or sequence detector, which is designed to achieve a low bit-error rate when reading data written on magnetic media in hard disk drives, tape drives, etc. As the density of data written on the media increases, along with faster write speeds, conventional read-detect methods and devices which read the data stored on the magnetic media often are not adequate to detect the data at the error rates required by the users of such methods and devices.

To address these issues, attempts have been made at improving the performance of data detectors in read channels for magnetic storage systems, in particular tape storage systems. Known solutions to improve the performance of data detectors in read channels that go beyond a standard detector design, such as partial response maximum likelihood (PRML) detection, noise-predictive maximum-likelihood (NPML) detection, data-dependent NPML (DD-NPML), post-processing techniques, and other methods. However, even these methods and devices do not effectively compensate for all of the slight variations in the data being read. For example, non-linear effects, e.g., non-linear transition shifts (NLTS) in the magnetic medium recording and readback processes, may degrade detection performance as the noise becomes non-zero-mean and non-Gaussian, which is not accounted for in NPML or DD-NPML detection.

SUMMARY

In one embodiment, a data storage system includes a head configured to produce a signal representing data stored on a storage medium, a bank of noise whitening filters configured to apply one or more noise whitening filters to the signal to produce a filtered signal, and a data-dependent noise mean calculator configured to estimate a data-dependent noise mean from the filtered signal. The system also includes a branch metric calculator configured to perform one or more branch metric calculations on the filtered signal to produce one or more branch metrics, the one or more branch metric calculations accounting for the data-dependent noise mean. Moreover, the system includes an adaptive data-dependent noise-predictive maximum likelihood (D3-NPML) detector configured to generate an output stream from the one or more branch metric calculations.

In another embodiment, a method includes receiving a signal representing data stored on a medium and applying one or more noise whitening filters to the signal using a bank of noise whitening filters to produce a filtered signal. The method also includes estimating a data-dependent noise mean from the filtered signal using a data-dependent noise mean calculator and performing one or more branch metric calculations on the filtered signal using a branch metric calculator to produce one or more branch metrics. The one or more branch metric calculations account for the data-dependent noise mean. Moreover, the method includes generating an output stream from the one or more branch metric calculations using an adaptive D3-NPML detector.

In another embodiment, a data storage system includes a magnetic head configured to produce a signal representing data stored to a magnetic tape and a least mean squared (LMS) engine configured to produce an array of predictor coefficients based on the signal. The data storage system also includes a bank of noise whitening filters configured to apply one or more noise whitening filters to the signal to produce a filtered signal using one or more predictor coefficients from the array of predictor coefficients. Moreover, the data storage system includes a data-dependent noise mean calculator configured to estimate a data-dependent noise mean from the filtered signal using exponential averaging and a branch metric calculator configured to perform one or more branch metric calculations on the filtered signal to produce one or more branch metrics. The one or more branch metric calculations account for the data-dependent noise mean. In addition, the data storage system includes an adaptive D3-NPML detector configured to generate an output stream from the one or more branch metric calculations.

Other aspects and embodiments of the present invention will become apparent from the following detailed description, which, when taken in conjunction with the drawings, illustrate by way of example the principles of the invention.

DETAILED DESCRIPTION

Figure 1:
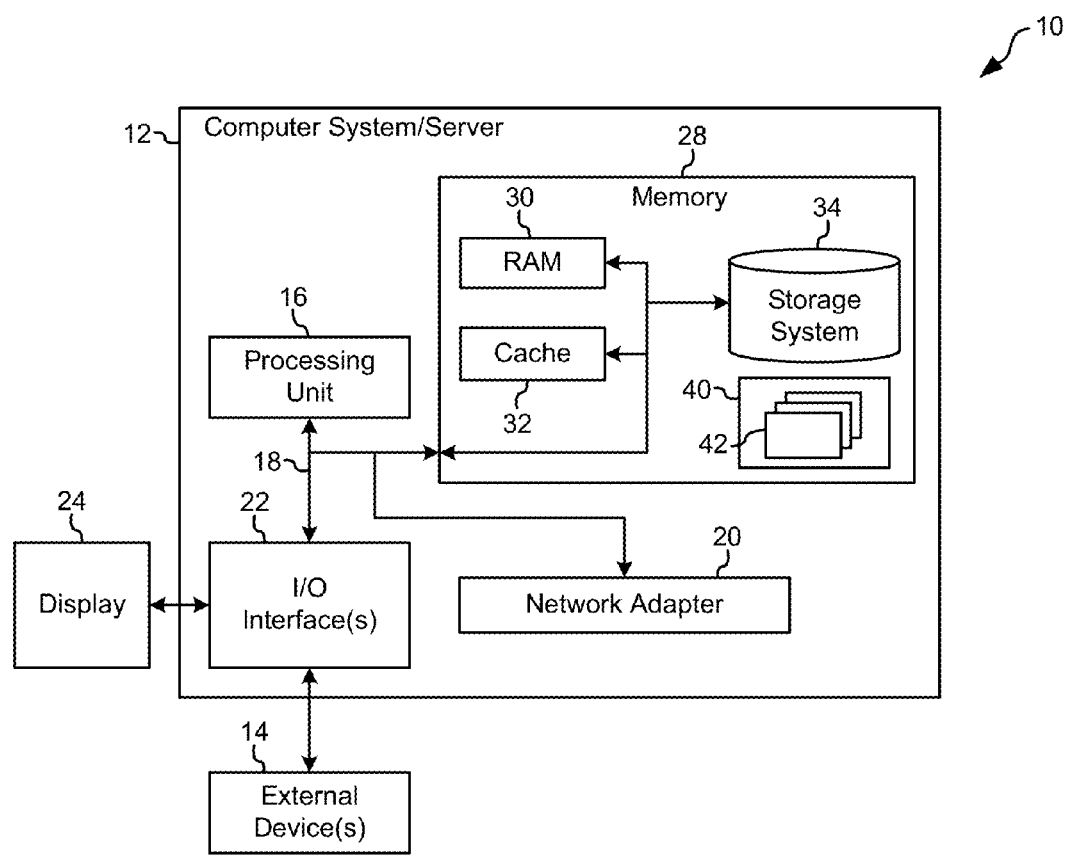
FIG. 1 illustrates a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for a data-dependent noise-predictive maximum-likelihood (DD-NPML) sequence detector which takes into account data-dependent noise with non-zero mean, typically arising in channels with non-linearities.

In one general embodiment, a data storage system includes a head configured to produce a signal representing data stored on a storage medium, a bank of noise whitening filters configured to apply one or more noise whitening filters to the signal to produce a filtered signal, and a data-dependent noise mean calculator configured to estimate a data-dependent noise mean from the filtered signal. The system also includes a branch metric calculator configured to perform one or more branch metric calculations on the filtered signal to produce one or more branch metrics, the one or more branch metric calculations accounting for the data-dependent noise mean. Moreover, the system includes an adaptive data-dependent noise-predictive maximum likelihood (D3-NPML) detector configured to generate an output stream from the one or more branch metric calculations.

In another general embodiment, a method includes receiving a signal representing data stored on a medium and applying one or more noise whitening filters to the signal using a bank of noise whitening filters to produce a filtered signal. The method also includes estimating a data-dependent noise mean from the filtered signal using a data-dependent noise mean calculator and performing one or more branch metric calculations on the filtered signal using a branch metric calculator to produce one or more branch metrics. The one or more branch metric calculations account for the data-dependent noise mean. Moreover, the method includes generating an output stream from the one or more branch metric calculations using an adaptive D3-NPML detector.

In another general embodiment, a data storage system includes a magnetic head configured to produce a signal representing data stored to a magnetic tape and a least mean squared (LMS) engine configured to produce an array of predictor coefficients based on the signal. The data storage system also includes a bank of noise whitening filters configured to apply one or more noise whitening filters to the signal to produce a filtered signal using one or more predictor coefficients from the array of predictor coefficients. Moreover, the data storage system includes a data-dependent noise mean calculator configured to estimate a data-dependent noise mean from the filtered signal using exponential averaging and a branch metric calculator configured to perform one or more branch metric calculations on the filtered signal to produce one or more branch metrics. The one or more branch metric calculations account for the data-dependent noise mean. In addition, the data storage system includes an adaptive D3-NPML detector configured to generate an output stream from the one or more branch metric calculations.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media, a tape drive for reading from or writing to a removable tape cartridge having a magnetic tape medium stored therein, etc., may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, and data archival storage systems, etc.

Figure 2A:
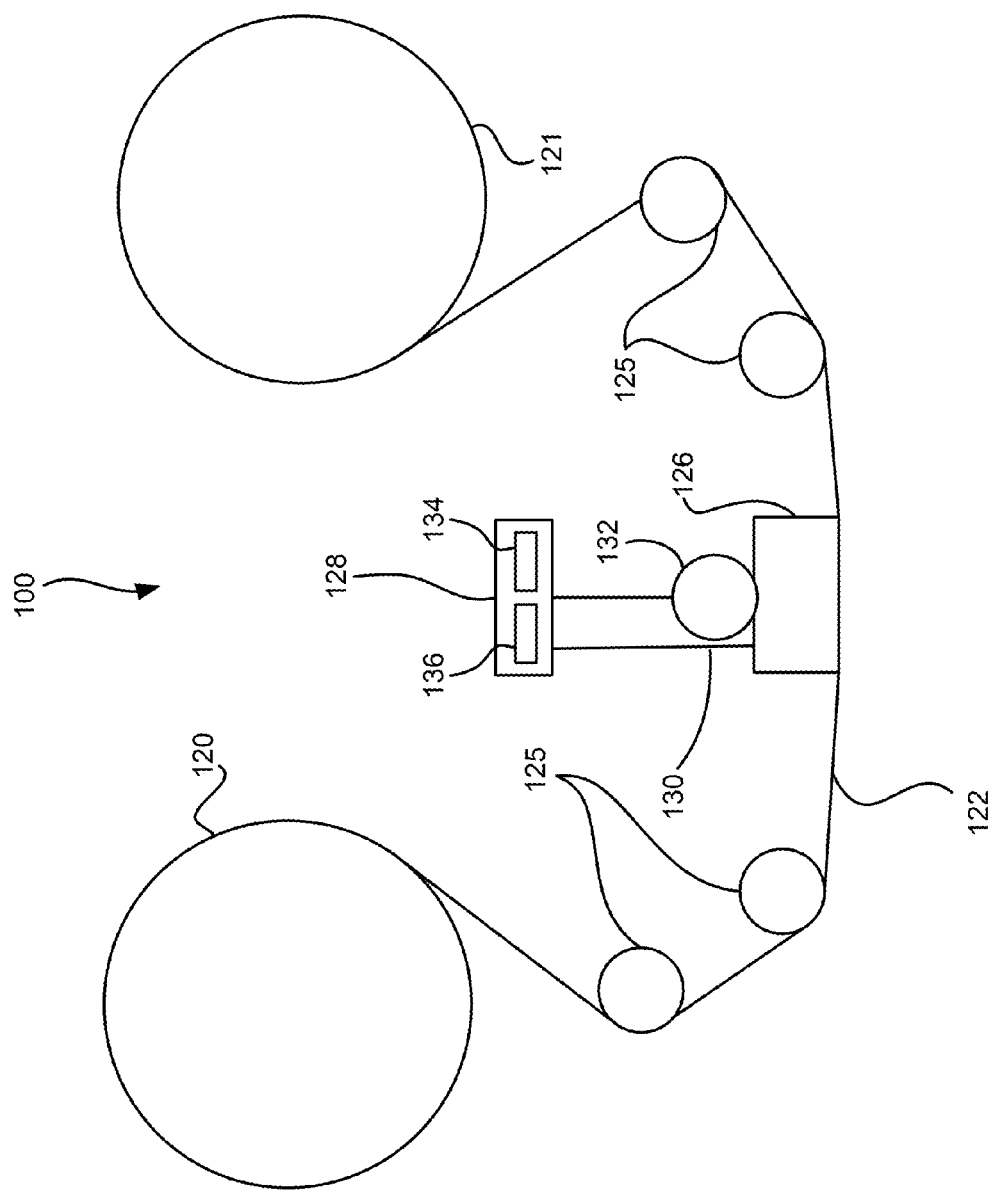
FIG. 2A illustrates a simplified tape drive of a tape-based data storage system, according to one embodiment.

FIG. 2A illustrates a simplified tape drive 100 of a tape-based data storage system, which may be employed in the context of the present invention. While one specific implementation of a tape drive is shown in FIG. 2A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 2A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the tape drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 2B:
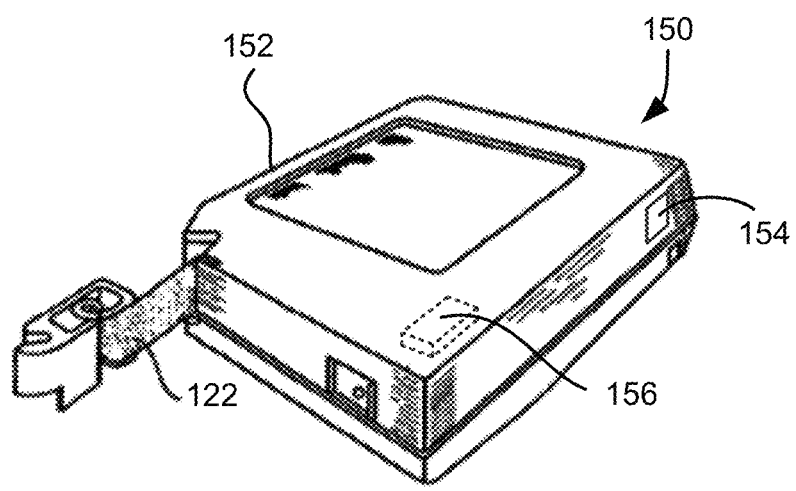
FIG. 2B is a schematic diagram of a tape cartridge according to one embodiment.

FIG. 2B illustrates an exemplary tape cartridge 150 according to one embodiment. Such tape cartridge 150 may be used with a system such as that shown in FIG. 2A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 2B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 3:
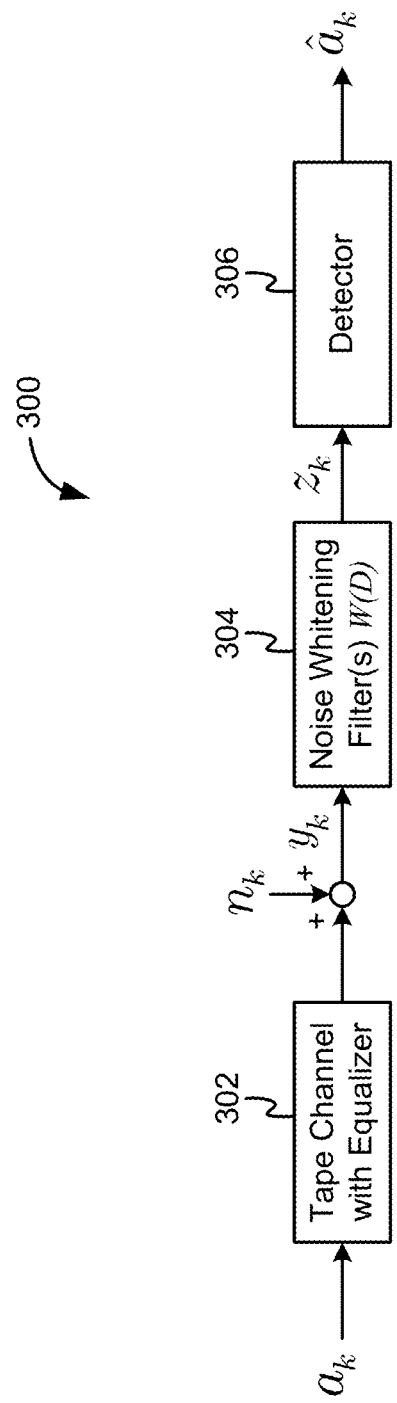
FIG. 3 shows a block diagram of a data flow, according to one embodiment.

Now referring to FIG. 3, a maximum-likelihood sequence detector (MLSD) 300 is shown according to one embodiment. In this MLSD 300, a bit sequence $\{a_k\}$ is written to and/or read from the tape medium, an operation that includes write drivers, write head, read head, pre-amplifier, and equalizer which are included in the tape channel 302. Due to imperfections and variations within the tape channel 302 some added noise ($n_k$) colors the equalized received signal prior to being analyzed by the detector 306. The detector 306 may utilize any detecting scheme known in the art, such as NPML, DD-NPML, etc. Due to the added noise ($n_k$), a whitening filter 304 is used that produces noise-whitened symbols ($z_k$) which are provided to the detector 306. Alternatively, more than one noise whitening filter 304 may be used in a bank of noise whitening filters to produce noise-adjusted symbols ($z_k$) which are provided to the detector 306, that ultimately outputs detected symbols ($\hat{a}_k$).

The noise whitening filter(s) 304 may apply any noise whitening algorithm(s) known in the art. In one embodiment, the noise whitening filter(s) 304 may apply a noise whitening filter W(D) to minimize the variance of the noise affecting the signal $z_k$ that is input to the detector 306. In one embodiment, the noise whitening filters may adhere to Equation 1.

$$W(D) = 1 - p_1(\underline{a})D - p_2(\underline{a})D^2 \qquad \text{Equation 1}$$

In Equation 1, W(D) is the noise whitening filter, $p_1(\underline{a})$ is a first filter parameter possibly depending on the binary sequence ($\underline{a}$), $p_2(\underline{a})$ is a second filter parameter possibly depending on the binary sequence ($\underline{a}$), and D represents delay corresponding to a bit duration.

In another approach, the noise whitening filter(s) 304 may apply a transfer function (polynomial) to $a_k$ according to Equation 2.

$$W(D)=1-[p_1(\underline{a})D+\ldots+p_n(\underline{a})D^n] \quad \text{Equation 2}$$

where the number of filter parameters n is larger or equal to two.

The term $\sigma^2(\underline{a})$ now refers to the (estimated) variance of the data-dependent noise as seen at the output of the noise whitening filter(s) 304. According to one embodiment, an algorithm implemented by the noise whitening filter(s) 304 may be represented by Equation 3.

$$z_k = y_k - p_1(\underline{a})y_{k-1} - p_2(\underline{a})y_{k-2} \quad \text{Equation 3}$$

In Equation 3, $z_k$ is the filtered sequence, $y_k$ is the input stream to the noise whitening filter(s) 304, $p_1(\underline{a})$ is a first programmable filter parameter possibly depending on the binary sequence ($\underline{a}$) from the input stream, and $p_2(\underline{a})$ is a second programmable filter parameter possibly depending on the binary sequence ($\underline{a}$) from the input stream.

The branch metric $m_k(S_{k-1}, S_k)$ used by the detector 306, according to one embodiment, may be represented by Equation 4.

$$m_k = \ln(\sigma^2(\underline{a})) + \frac{[z_k - \hat{z}_k(\underline{a})]^2}{\sigma^2(\underline{a})} \quad \text{Equation 4}$$

In Equation 4, $m_k$ is the branch metric, $\sigma^2(\underline{a})$ is the variance of the data-dependent noise, $z_k$ is the filtered sequence, and $\hat{z}_k(\underline{a})$ is an estimate of the filtered signal given the binary sequence (a).

In more embodiments, more than one noise whitening filter 304 may be employed. For example, 2, 4, 8, 16, 32, 64, 128, or more noise whitening filters 304 may be employed, such as in a bank of noise whitening filters. There may be M noise whitening filters 304 in the bank of noise whitening filters. In one approach, M may equal a number of branches of a soft detector trellis, e.g., a number of state transitions of the soft detector. In another approach, M may be smaller than the number of branches of the soft detector trellis.

For a 16-state DD-NPML detector operating in static channels, a bank of 32 noise whitening filters may be used, along with a fixed set of predictor coefficients and noise variance values.

However, the channel conditions are often slowly time-varying and/or not known a-priori, e.g. in magnetic tape recording due to environmental changes and media interchange. Hence for an adaptive 16-state DD-NPML detector, a bank of 32 noise whitening filters may be used, along with an array of predictor coefficients (memory bank) and an update engine, that may utilize least mean squared (LMS), an array of variance values (memory bank) and a variance update engine. The 16-state DD-NPML detector may also utilize a 16-state NPML/Viterbi block with a branch metric computation unit.

One skilled in the art will appreciate that the various components of the DD-NPML detector 306 may be scaled to work with a variety of systems having a variety of numbers of channels, e.g., 16, 32, 64, 128, etc. Many additional embodiments of DD-NPML are possible beyond that described above, and implementations are not meant to be limited by what is described herein, which is for illustrative purposes only. Any conceivable implementation of DD-NPML may be used.

The MLSD 300 is suitable and/or designed for a channel with zero-mean data-dependent finite-memory Gauss-Markov noise. The noise samples having a zero-mean allows this configuration to operate at near optimum performance. On the contrary, if this assumption is violated, e.g., due to non-linearities in the channel, the system performance starts to degrade.

Non-linear transition shifts (NLTS) may occur in the read data, an effect that occurs due to a write head writing a magnetic transition in close proximity to previously written transition(s). The location of the magnetic transition is influenced (shifted earlier or later than intended) by the previously written transitions, e.g., due to demagnetization effects. When these NLTS occur in the data read from the medium, the noise is non-Gaussian with a non-zero mean. Interestingly, NLTS affect the noise mean and variance in a deterministic, data-dependent way. Therefore, enhanced DD-NPML, referred to herein as double data-dependent NPML (D3-NPML), is proposed according to embodiments described herein that may account for this data-dependent noise mean resulting from NLTS and other non-linear effects that occur during data recording and readback.

In D3-NPML, according to one embodiment, a modified branch metric computation unit may be used that operates with a different branch metric, as shown in accordance with one embodiment in Equation 5.

$$m_k = \ln(\sigma^2(\underline{a})) + \frac{[z_k - \hat{z}_k(\underline{a}) - \mu(\underline{a})]^2}{\sigma^2(\underline{a})} \quad \text{Equation 5}$$

In Equation 5, all variables are the same as in Equation 4, above, except for the insertion of a variable, $\mu(\underline{a})$, that is the data-dependent noise mean, and is subtracted from the filtered sequence, $z_k$, in the squared bracketed value.

According to one embodiment, the data-dependent noise mean, $\mu(\underline{a})$, or new data-dependent noise mean, $\mu_{new}(\underline{a})$, may be estimated and/or calculated in an adaptive fashion using exponential averaging. One such algorithm is shown in Equation 6.

$$\mu(\underline{a}) = (1-\epsilon)\mu_{old}(\underline{a}) + \epsilon \cdot e_k(\underline{a}) \quad \text{Equation 6}$$

In Equation 6, $\underline{a}$ is the bit sequence, $\mu_{old}(\underline{a})$ is a previously estimated and/or calculated data-dependent noise mean, $\epsilon$ is a smoothing factor (where $0 \leq \epsilon \leq 1$, typically with c close to 0), and $e_k(\underline{a})$ is a filtered error-signal representing the noise estimate at the output of the whitening filter(s) 304 or noise prediction error.

An adaptive 16-state D3-NPML detector, according to one embodiment, may include a bank of 32 noise whitening filters, an array of predictor coefficients (memory bank) and an associated update engine (that may utilize LMS or some other suitable algorithm), an array of variance values (memory bank) and an associated variance update engine, an array of mean values (memory bank) and an associated mean update engine, and a 16-state data-dependent NPML/Viterbi block with a modified branch metric computation unit that utilizes the branch metric shown in Equation 7.

Figure 4:
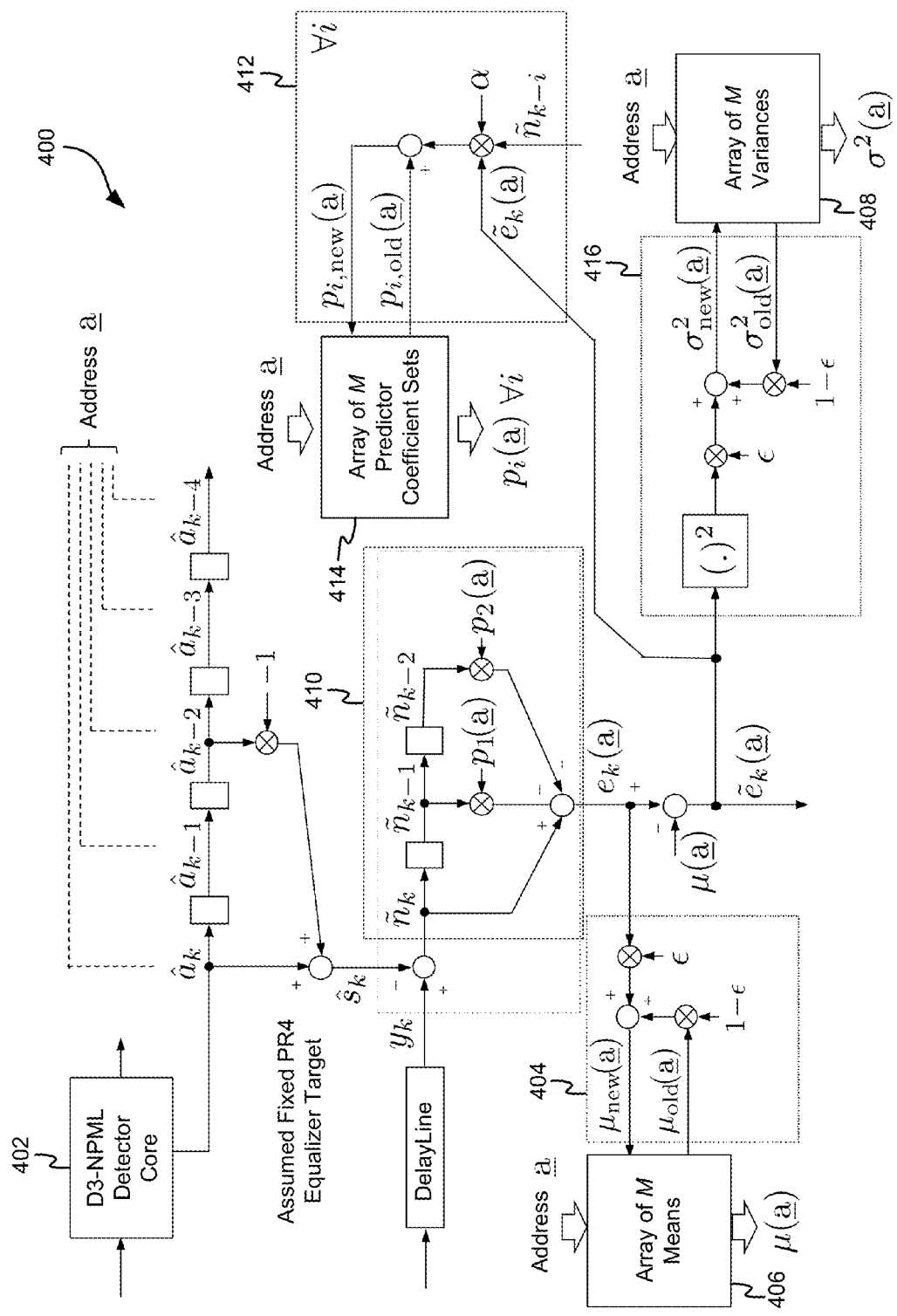
FIG. 4 shows a block diagram of an adaptive data-dependent noise-predictive maximum-likelihood (D3-NPML) detector with non-linear transition shift (NLTS) compensation, according to one embodiment.

A block diagram of an adaptive multi-state D3-NPML detector 400 is shown in FIG. 4 according to one embodiment. The adaptive D3-NPML detector 400 may use any number of discrete blocks or modules, according to various approaches, indicated by the individual blocks, as well as the components within the dashed-lines in FIG. 4. Of course, more or less blocks and/or modules are also possible, depending on the amount of adaptability and processing desired for the input signal. Also, some blocks may be used multiple times (e.g., the FIR filter 410, etc.).

In one embodiment, the adaptive D3-NPML detector 400 includes at least one multi-state D3-NPML detector core 402 that provides a detected bit stream to generate Address $\underline{a}$, at least one multi-tap FIR filter 410 to calculate a filtered error-signal $e_k(\underline{a})$, at least one LMS engine 412 to calculate an array of M predictor coefficient sets 414, at least one variance engine 416 to calculate an array of M variances 408, and a data-dependent noise mean calculator 404 configured to calculate an array of M noise means 406.

Of course, more or less noise mean estimates may be included in the array of noise means 406, in order to provide more or less intensive computation for inclusion of the noise mean term in the branch metric calculation.

In one embodiment, all noise mean estimates in the array of noise means 406 may be set to zero during initialization or startup of the adaptive D3-NPML detector 400. Moreover, all $\sigma^2$ coefficients produced from the array of M variances 408 may be set to 1 during initialization or startup of the D3-NPML detector 400 in accordance with one embodiment.

The number of states of the D3-NPML detector core 402 may be related to the number of entries in each array M, according to some predetermined relationship, such as 2M, 0.5M, etc. Moreover, M may be related to and/or equal to a number of branches that are possible in the branch metric calculation in one embodiment.

One embodiment of an adaptive multi-state D3-NPML detector 400 is a 16-state D3-NPML detector. In this example, according to one embodiment, the adaptive 16-state D3-NPML detector 400 may include a single 16-state D3-NPML detector core 402 with branch metric calculators, one two-tap FIR filter 410, an LMS engine 412 to calculate an array of 32 predictor coefficient sets 414, (e.g., 32 sets each comprising a first predictor coefficient ($p_1$) and a second predictor coefficient ($p_2$)), a single variance engine 416 to calculate an array of 32 variances ($\sigma^2$) 408 (or alternatively an array of 32 coefficients representing an inverse variance $1/\sigma^2$ and 32 coefficients representing a logarithmic variance ln $[\sigma^2]$), and a data-dependent noise mean calculator 404 configured to calculate an array of 32 noise means ($\mu$) 406 for each branch metric of the D3-NPML detector core 402.

Of course, other configurations are also possible, such as an 8-state adaptive D3-NPML detector, a 32-state adaptive D3-NPML detector, a 4-state adaptive D3-NPML detector, etc. Each of these configurations may also use multiple blocks, possibly in numbers different from those described in the example above. In one embodiment, the number of multiple blocks (e.g., the FIR filter(s) 410, etc.) used may be twice the number of states of the multi-state adaptive D3-NPML detector core 402.

Figure 5:
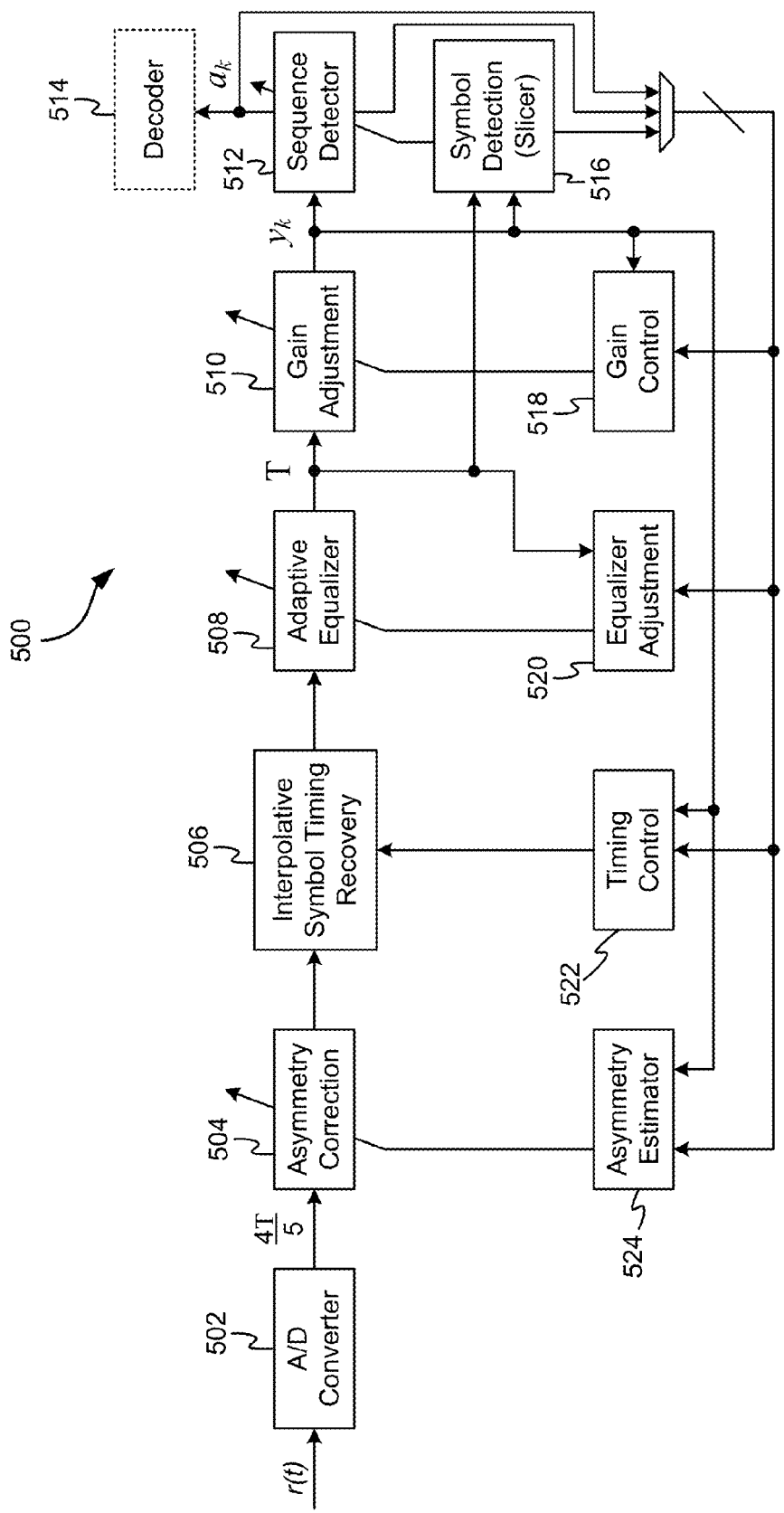
FIG. 5 shows a block diagram of a tape channel, according to one embodiment.

Now referring to FIG. 5, a block diagram of an adaptive synchronous tape read channel 500 is shown according to one embodiment. The tape read channel 500 may include an analog/digital (A/D) converter 502 configured to receive an input stream r(t) and output a timing sequence for the input stream 4T/5. The A/D converter 502 is configured to rely on asynchronous sampling to provide a sampling rate for the symbols in the input stream. The signal is then passed through an asymmetry compensator 504 to perform asymmetry correction on the signal. The asymmetry compensator 504 is configured to rely on asymmetry estimates provided by an asymmetry estimator 524 to perform the symmetry compensation. The signal is next passed to a timing block 506 configured to provide interpolative symbol timing recovery on the signal. The timing block 506 is configured to rely on timing estimates provided by a timing control block 522 to provide interpolative symbol timing recovery on the signal.

The signal is passed to an equalizer 508 after interpolative symbol timing recovery is performed on the signal. The equalizer 508 is configured to perform adaptive equalization on the signal, which relies on parameters set by an equalizer adjustment block 520. The signal then proceeds to a gain adjustment block 510 configured to adjust the gain of the signal, which relies on a gain control block 518 to provide parameters for gain adjustment of the signal. After the gain is adjusted on the signal, an adjusted signal, $y_k$, is passed to the sequence detector 512 for detection of the symbols in the adjusted signal.

In some embodiments, the detected symbols, $a_k$, may be passed from the sequence detector 512 to a decoder 514 for further processing. The sequence detector 512 is accompanied by a symbol-by-symbol detector (slicer) 516, which has inputs from the adaptive equalizer 508 and the adjusted signal, $y_k$, from the gain adjustment block 510.

The outputs from the slicer 516, the sequence detector 512, and the detected symbols, $a_k$, are selectively routed back to the gain control block 518, the equalizer adjustment block 520, the timing control block 522, and the asymmetry estimation block 524. The gain adjusted signal, $y_k$, is fed back to the gain control block 518, the timing control block 522, and the asymmetry estimation block 524.

The sequence detector 512 may be a Viterbi detector, an extended class-4 partial response (EPR4) detector, an NPML detector, a DD-NPML detector, the D3-NPML detector according to embodiments described herein, or some other suitable detector that would be known by one of skill in the art. A DD-NPML detector is described in detail in multiple embodiments in U.S. Pat. No. 8,670,199, which is herein incorporated by reference.

In one embodiment, the gain may be adjusted in the gain adjustment block 510 to provide a signal-to-noise ratio (SNRa) at an input to the sequence detector 512 that corresponds to the following relationship (for an EPR4 channel): $H(D)=1+D-D^2-D^3$, $y_k \in \{0, \pm 2, \pm 4\}$, with D being delay.

In one embodiment, the D3-NPML detector may be implemented with an asynchronous channel (utilizing an equalizer before/outside of the timing loop).

Figure 6:
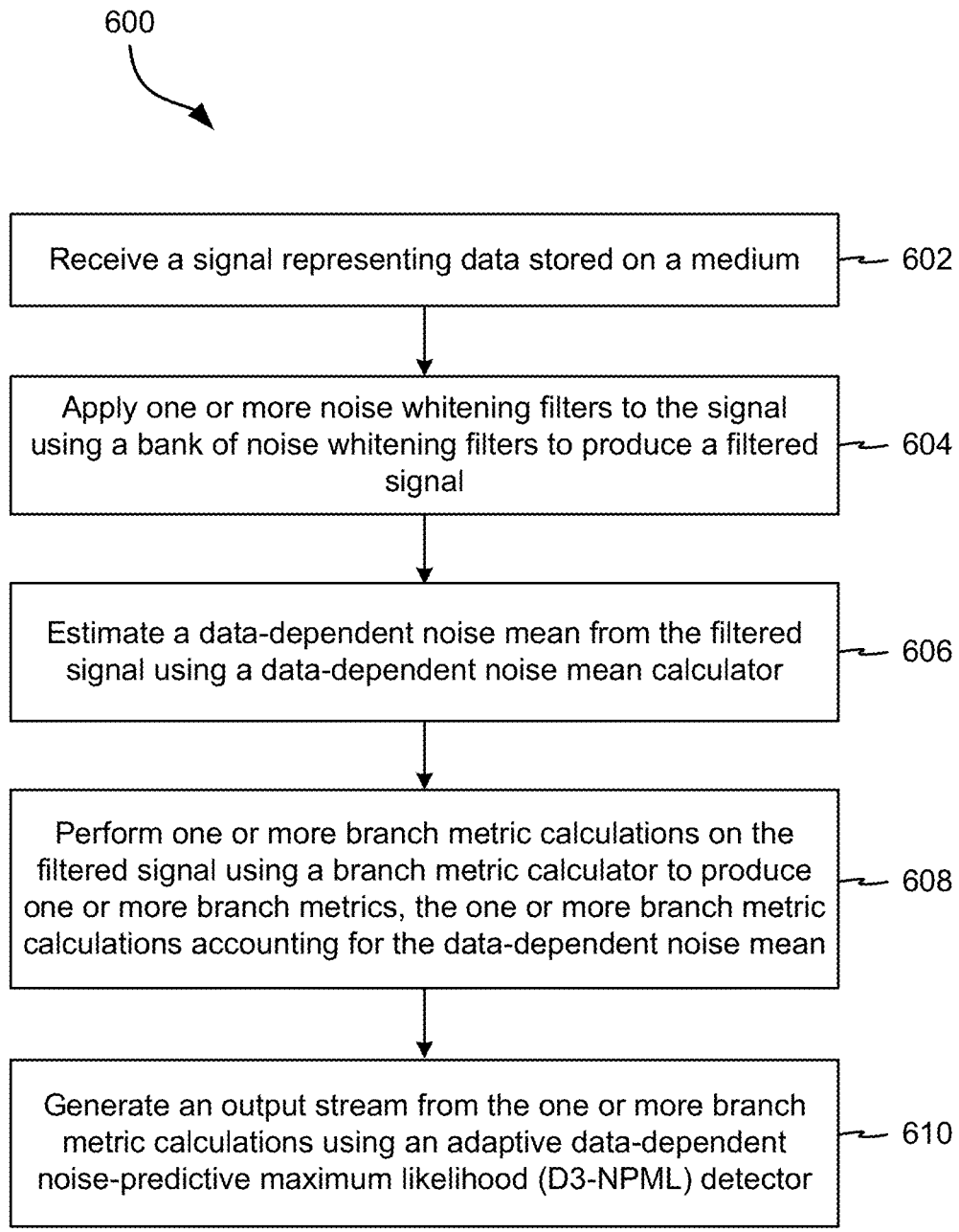
FIG. 6 is a flow diagram of a method according to one embodiment.

With reference to FIG. 6, a method for performing D3-NPML detection is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions. Moreover, the order of the operations may be changed from that shown in FIG. 6. Additionally, some or all of the operations may be executed in a repeating fashion, e.g., for each sample representing a symbol or bit, to enhance the adaptability of the D3-NPML detection.

Each of the steps of the method 600 may be performed by any suitable component of the operating environment. For example, in various embodiments, the method 600 may be partially or entirely performed by a processor, a controller, a tape drive, or some other device having one or more processors therein. The processor, e.g., processing circuit(s), chip(s), and/or module(s) implemented in hardware and/or software, and preferably having at least one hardware component, may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a signal representing data stored on a medium is received. The signal may be a bit stream comprising a binary sequence that represents the data. The bit stream may be received from a head of a device (such as a tape drive, hard disk drive, etc.) configured to read data from a medium (such as a magnetic tape, hard disk, etc.). In another embodiment, the bit stream may be received from some other component and/or module in a device, such as via a read channel in a tape drive.

The binary sequence comprises a sequence of "1's" and "0's" stored to a medium to represent data, thereby allowing a head to read the binary sequence to determine the data stored to the medium. The bit stream is a series of "1's" and "0's" that is read from the medium and includes the binary sequence that represents the data.

In operation 604, one or more noise whitening filters are applied to the signal using a bank of noise whitening filters to produce a filtered signal. A bank of noise whitening filters may comprise the one or more noise whitening filters, and may number from 1 to 256, 512, 1024, or more, depending on the processing capacity and desired level of noise removal.

In one embodiment, each of the noise whitening filters may apply a two-tap filter to the signal (which includes the bit stream). Each filter may be represented by: $z_k = y_k - p_1(\underline{a})y_{k-1} - p_2(\underline{a})y_{k-2}$, where $z_k$ is the filtered signal, $y_k$ is the bit stream, $p_1(\underline{a})$ is a first programmable filter parameter possibly depending on the binary sequence ($\underline{a}$) from the input stream, and $p_2(\underline{a})$ is a second programmable filter parameter possibly depending on the binary sequence ($\underline{a}$) from the input stream.

In another embodiment, each of the noise whitening filters may apply a three or more tap filter to the signal.

In operation 606, a data-dependent noise mean is estimated from the filtered signal using a data-dependent noise mean calculator. One or more data-dependent noise means may be calculated, in one embodiment.

According to one embodiment, the data-dependent noise mean is estimated using averaging.

In another embodiment, the data-dependent noise mean may be estimated according to Equation 6 using exponential averaging, or according to some other suitable algorithm known in the art.

For example, the data-dependent noise mean may be calculated according to: $\mu(\underline{a}) = (1-\epsilon)\mu_{old}(\underline{a}) + \epsilon \sim e_k(\underline{a})$, where $\underline{a}$ is the binary sequence, $\mu_{old}(\underline{a})$ is a previously calculated/estimated data-dependent noise mean, $\epsilon$ is smoothing factor, and $e_k(\underline{a})$ is an error signal representing the noise at the output of the whitening filter(s).

In operation 608, one or more branch metric calculations are performed on the filtered signal using a branch metric calculator to produce one or more branch metrics, the one or more branch metric calculations accounting for the data-dependent noise mean. In one embodiment, the branch metric is calculated according to Equation 4, above.

For example, each of the branch metric calculations may comprise:

$$m_k = \ln(\sigma^2(\underline{a})) + \frac{[z_k - \hat{z}_k(\underline{a}) - \mu(\underline{a})]^2}{\sigma^2(\underline{a})},$$

where $m_k$ is the branch metric, $\sigma^2(\underline{a})$ is the variance of the data-dependent noise, $z_k$ is the filtered signal, $\hat{z}_k(\underline{a})$ is an estimate of the filtered signal given the binary sequence ($\underline{a}$), and $\mu(\underline{a})$ is the data-dependent noise mean.

In each branch metric calculation of operation 608, the data-dependent noise mean estimated in operation 606 is used in the calculation to produce results that provide for greater performance.

In operation 610, an output stream is generated from the one or more branch metric calculations using a D3-NPML detector. The output stream represents the most likely data stored to the medium, as some amount of uncertainty may still exist as to what data was actually stored to the medium.

In a further embodiment, method 600 may include performing asymmetry correction on the filtered signal, e.g., by using an asymmetry correction module. Furthermore, method 600 may include producing an array of predictor coefficients, e.g., by using a LMS engine, for use in the noise whitening filter of operation 604. According to another embodiment, method 600 may include adjusting a gain for the filtered signal, e.g., by using a gain adjustment module.

Any of these modules may be implemented in a hardware processor in one embodiment, or via a combination of hardware and software, in another embodiment.

According to one embodiment, the D3-NPML detector may have N states, where N∈4, 8, 16, 32, 64. In further approaches, N may be greater than 64, such as 128, 256, 512, etc. In another embodiment, the bank of noise whitening filters may comprise 2×N (or less) noise whitening filters. In yet another embodiment, 2×N branch metric calculations may be used (or more).

Method 600 may also include producing an array of 2×N (or less) variance calculations using a variance engine based on an output of the N-state D3-NPML detector.

Figure 7:
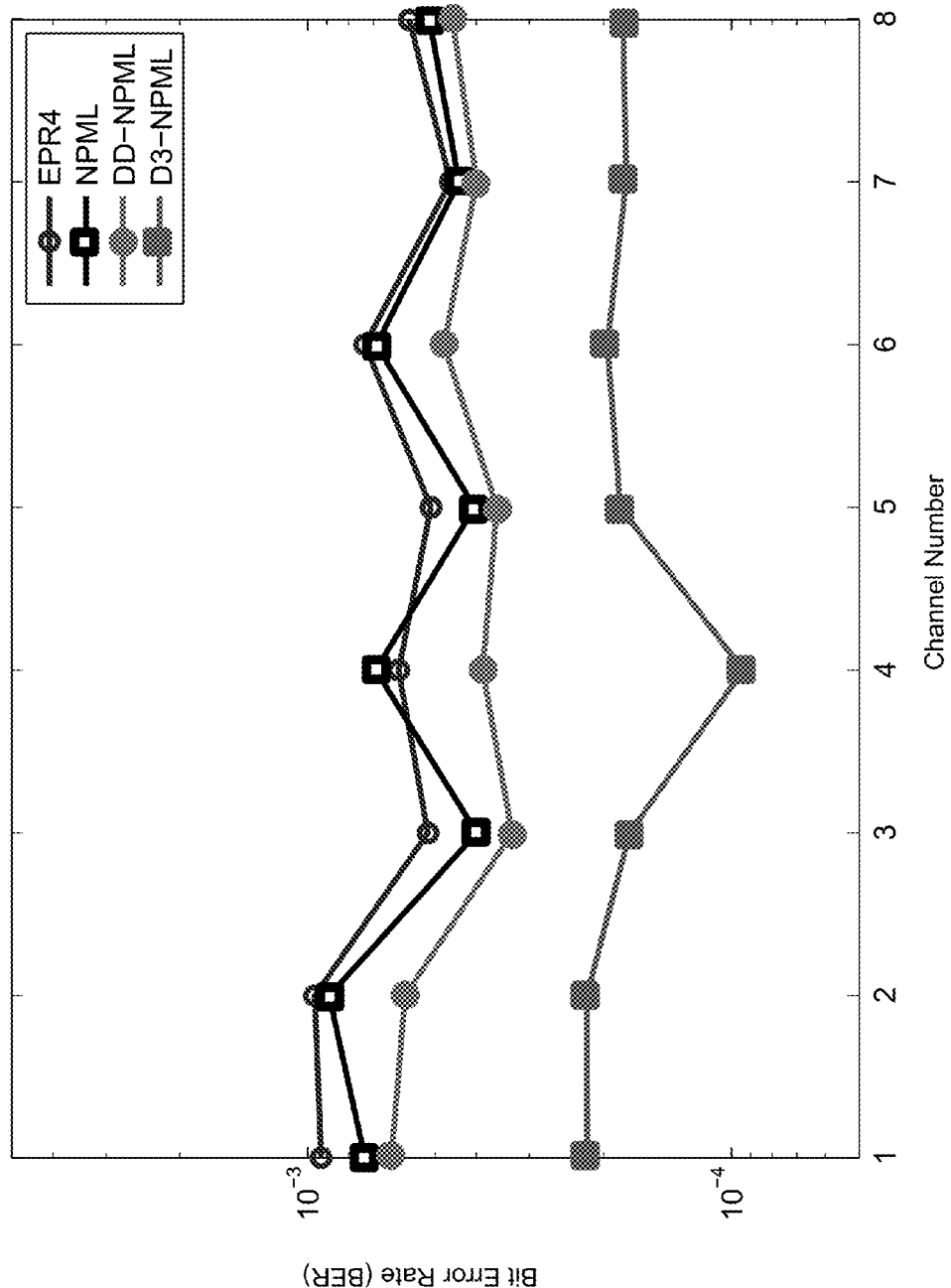
FIG. 7 shows a chart of bit error rate (BER) versus channel number for data detected using four different detectors.

Now referring to FIG. 7, a chart shows the bit error rate (BER) versus channel number for data recorded on a magnetic tape at a linear density of 650 kbpi with a SNRa of about 12 dB detected using four different detectors: an EPR4 detector, an NPML detector, a DD-NPML detector, and a D3-NPML detector according to embodiments described herein. As can be seen in FIG. 7, the BER for each channel of the D3-NPML is significantly less than the BER for any of the other detectors. This shows a great improvement in error rate performance for the D3-NPML detector over currently available detection schemes.

Figure 8:
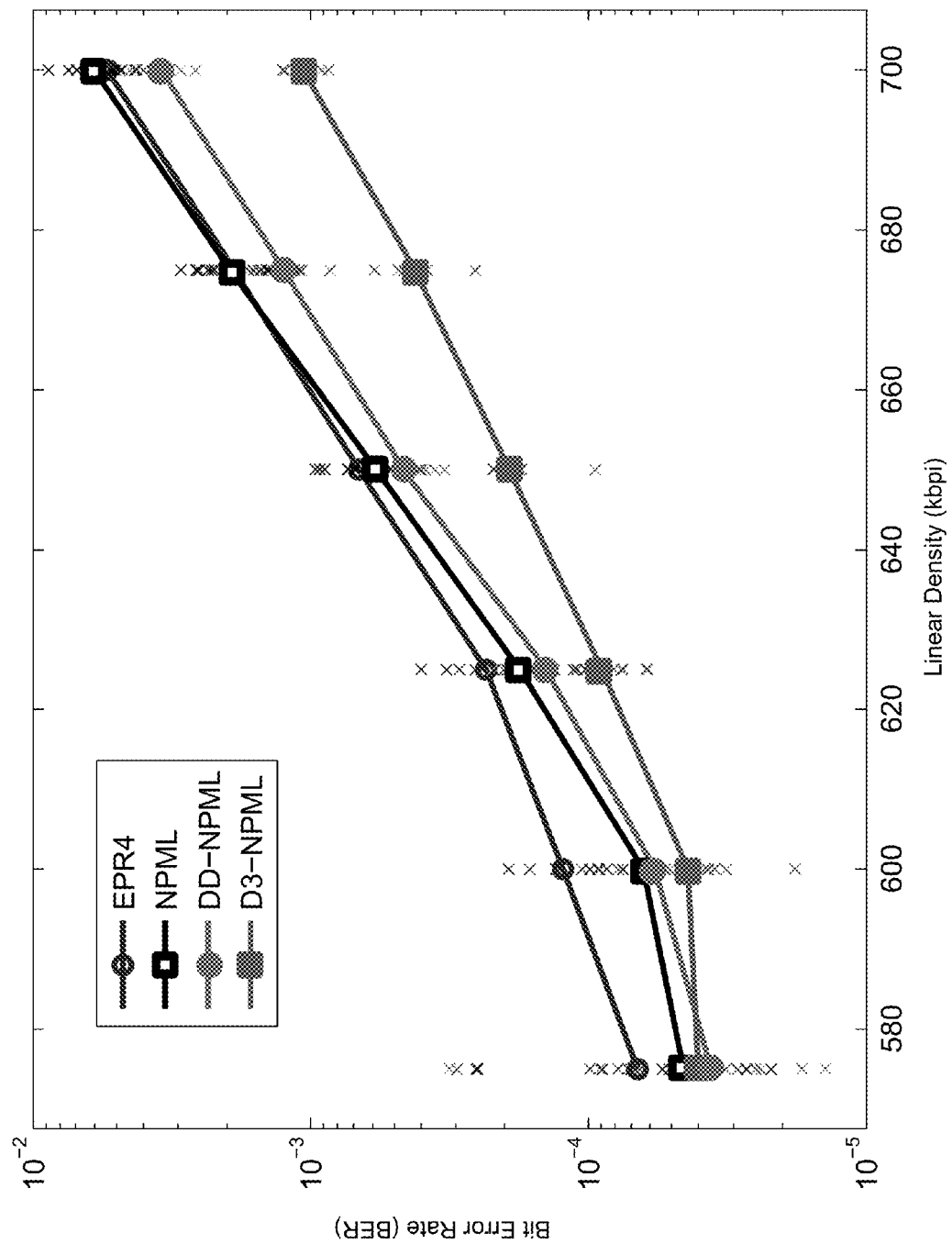
FIG. 8 shows a chart of BER versus linear density for data detected using four different detectors.

FIG. 8 shows a chart of the BER versus linear density for data detected using the four different detectors: EPR4, NPML, DD-NPML, and D3-NPML according to embodiments described herein. As can be seen in FIG. 8, the BER across most linear densities using D3-NPML is significantly less than the BER for any of the other detectors (except at the initial linear density of 575 kpbi). This improved error rate performance for the D3-NPML detector over currently available detection schemes may be due to large data-dependent non-zero means in the data detected.

Any of the embodiments described herein may be used in addition to write pre-compensation to provide robust NLTS compensation in the read channel data detection. In pre-compensation, the location of the transition from one bit type to another bit type is shifted when writing the data to the medium in a manner which will lessen the NLTS upon reading the data from the medium.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic, software logic such as firmware, part of an operating system, part of an application program, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A data storage system, comprising:
a head configured to produce a signal representing data stored on a storage medium;
a bank of noise whitening filters configured to apply one or more noise whitening filters to the signal to produce a filtered signal;
a data-dependent noise mean calculator configured to estimate a data-dependent noise mean from the filtered signal;
a branch metric calculator configured to perform one or more branch metric calculations on the filtered signal to produce one or more branch metrics, the one or more branch metric calculations accounting for the data-dependent noise mean; and
an adaptive data-dependent noise-predictive maximum likelihood (D3-NPML) detector configured to generate an output stream from the one or more branch metric calculations.

2. The data storage system as recited in claim 1, wherein the medium is a magnetic tape.

3. The data storage system as recited in claim 1, comprising a least mean squared (LMS) engine configured to produce an array of predictor coefficients.

4. The data storage system as recited in claim 1, wherein the adaptive D3-NPML detector has N states, where N∈4, 8, 16, 32, 64.

5. The data storage system as recited in claim 4, wherein the bank of noise whitening filters comprises 2×N noise whitening filters, each of the noise whitening filters applying a two-tap filter to the signal, the filter being represented by $z_k = y_k - p_1(\underline{a}) y_{k-1} - p_2(\underline{a}) y_{k-2}$, where $z_k$ is the filtered signal, $y_k$ is the signal, $p_1(\underline{a})$ is a first programmable filter parameter, and $p_2(\underline{a})$ is a second programmable filter parameter.

6. The data storage system as recited in claim 4, wherein 2×N branch metric calculations are used, each of the branch metric calculations comprising:

$$m_k = \ln(\sigma^2(\underline{a})) + \frac{[z_k - \hat{z}_k(\underline{a}) - \mu(\underline{a})]^2}{\sigma^2(\underline{a})},$$

where $m_k$ is the branch metric, $\sigma^2(\underline{a})$ is a variance of data-dependent noise, $z_k$ is the filtered signal, $\hat{z}_k(\underline{a})$ is an estimate of the filtered signal given a binary sequence $(\underline{a})$ from the signal, and $\mu(\underline{a})$ is the data-dependent noise mean.

7. The data storage system as recited in claim 6, further comprising a variance engine configured to produce an array of 2×N variance calculations based on an output of the adaptive D3-NPML detector.

8. The data storage system as recited in claim 1, wherein the data-dependent noise mean is calculated according to: $\mu(\underline{a}) = (1-\epsilon)\mu_{old}(\underline{a}) + \epsilon \cdot e_k(\underline{a})$, where $\underline{a}$ is a binary sequence from the signal, $\mu_{old}(\underline{a})$ is a previously calculated and/or estimated data-dependent noise mean, $\epsilon$ is a smoothing factor, and $e_k(\underline{a})$ is a filtered error-signal representing a noise estimate at an output of the one or more noise whitening filters.

9. A method comprising:
receiving a signal representing data stored on a medium;
applying one or more noise whitening filters to the signal using a bank of noise whitening filters to produce a filtered signal;
estimating a data-dependent noise mean from the filtered signal using a data-dependent noise mean calculator;
performing one or more branch metric calculations on the filtered signal using a branch metric calculator to produce one or more branch metrics, the one or more branch metric calculations accounting for the data-dependent noise mean; and
generating an output stream from the one or more branch metric calculations using an adaptive data-dependent noise-predictive maximum likelihood (D3-NPML) detector.

10. The method as recited in claim 9, wherein the medium is a magnetic tape.

11. The method as recited in claim 9, further comprising producing an array of predictor coefficients using a least mean squared (LMS) engine.

12. The method as recited in claim 9, wherein the adaptive D3-NPML detector has N states, where N∈4, 8, 16, 32, 64.

13. The method as recited in claim 12, wherein the bank of noise whitening filters comprises 2×N noise whitening filters, each of the noise whitening filters applying a two-tap filter to the signal, the filter being represented by:
$z_k = y_k - p_1(\underline{a}) y_{k-1} - p_2(\underline{a}) y_{k-2}$, where $z_k$ is the filtered signal, $y_k$ is the signal, $p_1(\underline{a})$ is a first programmable filter parameter, and $p_2(\underline{a})$ is a second programmable filter parameter.

14. The method as recited in claim 12, wherein 2×N branch metric calculations are used, each of the branch metric calculations comprising:

$$m_k = \ln(\sigma^2(\underline{a})) + \frac{[z_k - \hat{z}_k(\underline{a}) - \mu(\underline{a})]^2}{\sigma^2(\underline{a})},$$

where $m_k$ is the branch metric, $\sigma^2(\underline{a})$ is a variance of a data-dependent noise, $z_k$ is the filtered signal, $\hat{z}_k(\underline{a})$ is an estimate of the filtered signal given a binary sequence $(\underline{a})$ from the signal, and $\mu(\underline{a})$ is the data-dependent noise mean.

15. The method as recited in claim 14, further comprising producing an array of 2×N variance calculations using a variance engine based on an output of the adaptive D3-NPML detector.

16. The method as recited in claim 9, wherein the data-dependent noise mean is calculated according to: $\mu(\underline{a})=(1-\epsilon)\mu_{old}(\underline{a})+\epsilon \cdot e_k(\underline{a})$, where $\underline{a}$ is a binary sequence from the signal, $\mu_{old}(\underline{a})$ is a previously calculated data-dependent noise mean, $\epsilon$ is a smoothing factor, and $e_k(\underline{a})$ is a filtered error-signal representing a noise estimate at an output of the one or more noise whitening filters.

17. A data storage system, comprising:
a magnetic head configured to produce a signal representing data stored to a magnetic tape;
a least mean squared (LMS) engine configured to produce an array of predictor coefficients based on the signal;
a bank of noise whitening filters configured to apply one or more noise whitening filters to the signal to produce a filtered signal using one or more predictor coefficients from the array of predictor coefficients;
a data-dependent noise mean calculator configured to estimate a data-dependent noise mean from the filtered signal using exponential averaging;
a branch metric calculator configured to perform one or more branch metric calculations on the filtered signal to produce one or more branch metrics, the one or more branch metric calculations accounting for the data-dependent noise mean; and
an adaptive data-dependent noise-predictive maximum likelihood (D3-NPML) detector configured to generate an output stream from the one or more branch metric calculations.

18. The data storage system as recited in claim 17, further comprising:
an asymmetry correction module configured to perform asymmetry correction on the filtered signal; and
a gain adjustment module configured to adjust a gain for the filtered signal.

19. The data storage system as recited in claim 17, wherein each of the branch metric calculations comprises:

$$m_k = \ln(\sigma^2(\underline{a})) + \frac{[z_k - \hat{z}_k(\underline{a}) - \mu(\underline{a})]^2}{\sigma^2(\underline{a})},$$

where $m_k$ is the branch metric, $\sigma^2(\underline{a})$ is a variance of a data-dependent noise, $z_k$ is the filtered signal, $\hat{z}_k(\underline{a})$ is an estimate of the filtered signal given a binary sequence $(\underline{a})$ from the signal, and $\mu(\underline{a})$ is the data-dependent noise mean.

20. The data storage system as recited in claim 17, wherein the data-dependent noise mean is calculated according to: $\mu(\underline{a})=(1-\epsilon)\mu_{old}(\underline{a})+\epsilon \cdot e_k(\underline{a})$, where $\underline{a}$ is a binary sequence from the signal, $\mu_{old}(\underline{a})$ is a previously calculated data-dependent noise mean, $\epsilon$ is smoothing factor, and $e_k(\underline{a})$ is a filtered error-signal representing a noise estimate at an output of the one or more noise whitening filters.

* * * * *